United States Patent
Yilmazlar

(10) Patent No.: US 11,671,171 B2
(45) Date of Patent: Jun. 6, 2023

(54) SATELLITE DISH LNB, SATELLITE BROADCAST SIGNAL RECEIVER AND METHODS OF OPERATION

(71) Applicant: Vestel Elektronik Sanayi ve Ticaret A.S., Manisa (TR)

(72) Inventor: İsmail Yilmazlar, Manisa (TR)

(73) Assignee: VESTEL ELEKTRONIK SANAYI VE TICARET A.S., Manisa (TR)

( * ) Notice: Subject to any disclaimer, the term of this patent is extended or adjusted under 35 U.S.C. 154(b) by 321 days.

(21) Appl. No.: 17/259,411

(22) PCT Filed: Jul. 11, 2018

(86) PCT No.: PCT/EP2018/068826
§ 371 (c)(1),
(2) Date: Jan. 11, 2021

(87) PCT Pub. No.: WO2020/011351
PCT Pub. Date: Jan. 16, 2020

(65) Prior Publication Data
US 2021/0258070 A1    Aug. 19, 2021

(51) Int. Cl.
*H04B 7/185* (2006.01)
*H04H 20/76* (2008.01)

(52) U.S. Cl.
CPC ......... *H04B 7/18543* (2013.01); *H04H 20/76* (2013.01)

(58) Field of Classification Search
CPC .... H04B 7/18543; H04H 20/76; H04H 40/90; H04H 20/63; H04N 5/268; H04N 7/20
(Continued)

(56) References Cited

U.S. PATENT DOCUMENTS

| 7,542,715 B1 | 6/2009 | Gurantz |
| 2008/0222682 A1* | 9/2008 | Beales ............ H04N 7/20 348/E7.093 |

(Continued)

FOREIGN PATENT DOCUMENTS

WO    2015/150422 A1    10/2015

OTHER PUBLICATIONS

PCT/EP2018/068826 filed Jul. 11, 2018 specification (14 pages), PCT written opinion (6 pages), international search (2 pages), and Search strategy with results (1 page).

*Primary Examiner* — Shaima Q Aminzay
(74) *Attorney, Agent, or Firm* — J. Miguel Hernandez; James R. Gourley; Carstens, Allen & Gourley, LLP

(57) ABSTRACT

Low-noise block downconverter (LNB) of a satellite dish receives a request from a satellite broadcast signal receiver to transmit a signal for a channel to the receiver. If the channel requested by the receiver is different from a channel requested by another satellite broadcast signal receiver, the LNB in response provides a signal for the channel requested by the receiver at a frequency that is allocated to the receiver. If the channel requested by the receiver is the same as a channel requested by another satellite broadcast signal receiver, the LNB provides an instruction to the requesting receiver for the receiver to retune to the frequency used for the other satellite broadcast signal receiver. The requesting receiver can then receive the signal for said channel which is being provided by the LNB at the frequency used for the other satellite broadcast signal receiver.

10 Claims, 2 Drawing Sheets

(58) Field of Classification Search
USPC .......................................................... 455/13.4
See application file for complete search history.

(56) References Cited

U.S. PATENT DOCUMENTS

2015/0215681 A1 7/2015 Wong
2017/0302302 A1 10/2017 Adamski

* cited by examiner

US 11,671,171 B2

SATELLITE DISH LNB, SATELLITE BROADCAST SIGNAL RECEIVER AND METHODS OF OPERATION

CROSS REFERENCE TO RELATED APPLICATION

This application is a US 371 application from PCT/EP2018/068826 entitled "Satellite Dish LNB, Satellite Broadcast Signal Receiver and Methods of Operation" filed on Jul. 11, 2018 and published as WO 2020/011351 A1 on Jan. 16, 2020. The technical disclosures of every application and publication listed in this paragraph are hereby incorporated herein by reference.

TECHNICAL FIELD

The present disclosure relates to a LNB (low-noise block downconverter) of a satellite dish, a satellite broadcast signal receiver, methods of operation and computer programs therefor.

BACKGROUND

A satellite broadcast signal receiver is connected in use to a LNB of a satellite dish in order to receive signals broadcast by a satellite, typically for receiving television and/or radio channels. The receiver sends control signals to the LNB as required in order to reconfigure the LNB to select a desired channel that can be received by the satellite dish.

So-called "single cable distribution" (sometimes known by the name "unicable") is known which enables the simultaneous delivery of channels from a single satellite dish to multiple receivers (typically for multiple users) over a single coaxial cable. In known single cable distribution, each receiver is allocated a "user band" having a different centre frequency (an "intermediate frequency") for the signals that carry the channel signal (i.e. the broadcast programme) and that are passed from the satellite dish to the receiver.

SUMMARY

According to a first aspect disclosed herein, there is provided a method of operating a LNB of a satellite dish which is operating according to single cable distribution in which a first frequency is allocated for a first satellite broadcast signal receiver to receive signals from the LNB and a second frequency different from the first frequency is allocated for a second satellite broadcast signal receiver to receive signals from the LNB, the method comprising:

the LNB receiving a request from the first satellite broadcast signal receiver to transmit a signal for a channel to the first satellite broadcast signal receiver, the LNB in response providing a signal for said channel at the first frequency which is allocated to the first satellite broadcast signal receiver;

the LNB receiving a request from the second satellite broadcast signal receiver to transmit a signal for a channel to the second satellite broadcast signal receiver;

wherein:

if the channel requested by the second satellite broadcast signal receiver is different from the channel requested by the first satellite broadcast signal receiver, the LNB in response provides a signal for the channel requested by the second satellite broadcast signal receiver at the second frequency which is allocated to the second satellite broadcast signal receiver, and if the channel requested by the second satellite broadcast signal receiver is the same as the channel requested by the first satellite broadcast signal receiver, the LNB in response provides an instruction to the second satellite broadcast signal receiver for the second satellite broadcast signal receiver to retune to the first frequency such that the second satellite broadcast signal receiver receives the signal for said channel which is being provided by the LNB at the first frequency.

In this way, power consumption at the LNB may be reduced in the case that plural satellite broadcast signal receivers are being used to watch or listen to the same channel because the LNB only needs to provide one signal at one frequency for those plural satellite broadcast signal receivers. In the case that several (e.g. up to the usual maximum of 8) satellite broadcast signal receivers are connected to the LNB and are all being used to watch or listen to the same channel, this can present a relatively large saving. Further, given that this may be applied across thousands or even millions of deployed single cable distribution systems, the overall power saving across a population can be large.

The signals, which contain the television or radio or the like channels, are transmitted over a cable to the satellite broadcast signal receiver. In a single cable distribution, there is a single cable which passes from the LNB to all of the satellite broadcast signal receivers that are intended to receive channels from the LNB (or, at least, there is a single cable from the LNB into the dwelling or other building in which the satellite broadcast signal receivers are located, even if ultimately there may be separate cables which split off from that single cable and which provide the final connection to the individual satellite broadcast signal receivers).

In an example, the LNB comprises at least a first local oscillator for generating an intermediate frequency signal at the first frequency and a second local oscillator for generating an intermediate frequency signal at the second frequency, wherein the signal for a channel that is sent by the LNB to a satellite broadcast signal receiver is formed by mixing a radio signal for the channel received at the satellite dish with the intermediate frequency signal for that satellite broadcast signal receiver, wherein if the channel requested by the second satellite broadcast signal receiver is the same as the channel requested by the first satellite broadcast signal receiver, the second local oscillator is not operated or is switched off or is used to provide a different channel to another satellite broadcast signal receiver.

According to a second aspect disclosed herein, there is provided a LNB for a satellite dish which is operable according to single cable distribution in which a first frequency is allocated for a first satellite broadcast signal receiver to receive signals from the LNB and a second frequency different from the first frequency is allocated for a second satellite broadcast signal receiver to receive signals from the LNB, the LNB being arranged to:

receive a request from a said first satellite broadcast signal receiver to transmit a signal for a channel to said first satellite broadcast signal receiver and, in response, provide a signal for said channel at the first frequency which is allocated to said first satellite broadcast signal receiver;

receive a request from a said second satellite broadcast signal receiver to transmit a signal for a channel to said second satellite broadcast signal receiver;

wherein the LNB is arranged such that:

if the channel requested by a said second satellite broadcast signal receiver is different from the channel requested by a said first satellite broadcast signal receiver, the LNB in response provides a signal for the channel requested by said second satellite broadcast signal receiver at the second frequency which is allocated to said second satellite broadcast signal receiver, and if the channel requested by a said second satellite broadcast signal receiver is the same as the channel requested by a said first satellite broadcast signal receiver, the LNB in response provides an instruction to said second satellite broadcast signal receiver for said second satellite broadcast signal receiver to retune to the first frequency such that said second satellite broadcast signal receiver is able to receive the signal for said channel which is being provided by the LNB at the first frequency.

In an example, the LNB comprises at least a first local oscillator for generating an intermediate frequency signal at the first frequency and a second local oscillator for generating an intermediate frequency signal at the second frequency, the LNB being arranged such that the signal for a channel that is sent by the LNB to a satellite broadcast signal receiver is formed by mixing a radio signal for the channel received at the satellite dish with the intermediate frequency signal for that satellite broadcast signal receiver, wherein if the channel requested by a said second satellite broadcast signal receiver is the same as the channel requested by a said first satellite broadcast signal receiver, the second local oscillator is not operated or is switched off or is used to provide a different channel to another satellite broadcast signal receiver.

According to a third aspect disclosed herein, there is provided a computer program comprising instructions such that when the computer program is executed on LNB of a satellite dish which is operating according to single cable distribution, the LNB is arranged to carry out a method comprising:

the LNB receiving a request from the first satellite broadcast signal receiver to transmit a signal for a channel to the first satellite broadcast signal receiver, the LNB in response providing a signal for said channel at the first frequency which is allocated to the first satellite broadcast signal receiver;

the LNB receiving a request from the second satellite broadcast signal receiver to transmit a signal for a channel to the second satellite broadcast signal receiver;

wherein:

if the channel requested by the second satellite broadcast signal receiver is different from the channel requested by the first satellite broadcast signal receiver, the LNB in response provides a signal for the channel requested by the second satellite broadcast signal receiver at the second frequency which is allocated to the second satellite broadcast signal receiver, and if the channel requested by the second satellite broadcast signal receiver is the same as the channel requested by the first satellite broadcast signal receiver, the LNB in response provides an instruction to the second satellite broadcast signal receiver for the second satellite broadcast signal receiver to retune to the first frequency such that the second satellite broadcast signal receiver receives the signal for said channel which is being provided by the LNB at the first frequency.

There may be provided a non-transitory computer-readable storage medium storing a computer program as described above.

In an example, the computer program comprises instructions such that, where the LNB comprises at least a first local oscillator for generating an intermediate frequency signal at the first frequency and a second local oscillator for generating an intermediate frequency signal at the second frequency, and the signal for a channel that is sent by the LNB to a satellite broadcast signal receiver is formed by mixing a radio signal for the channel received at the satellite dish with the intermediate frequency signal for that satellite broadcast signal receiver:

if the channel requested by the second satellite broadcast signal receiver is the same as the channel requested by the first satellite broadcast signal receiver, the second local oscillator is not operated or is switched off or is used to provide a different channel to another satellite broadcast signal receiver.

According to a fourth aspect disclosed herein, there is provided a method of operating a satellite broadcast signal receiver for receiving signals from a LNB of a satellite dish which is operating according to single cable distribution in which a first frequency is allocated for a first satellite broadcast signal receiver to receive signals from the LNB and a second frequency different from the first frequency is allocated for a second satellite broadcast signal receiver to receive signals from the LNB, the method comprising:

the satellite broadcast signal receiver sending a request to the LNB for the LNB to transmit a signal for a channel to the satellite broadcast signal receiver;

wherein:

if the channel requested by the satellite broadcast signal receiver is different from a channel requested from the LNB by another satellite broadcast signal receiver, the satellite broadcast signal receiver receives from the LNB in response a signal for the channel requested by the satellite broadcast signal receiver at a frequency that is allocated to the satellite broadcast signal receiver, and if the channel requested by the satellite broadcast signal receiver is the same as a channel requested by another satellite broadcast signal receiver, the satellite broadcast signal receiver retunes to a frequency that is being used by the LNB to provide a signal to said other satellite broadcast signal receiver, such that the satellite broadcast signal receiver receives the signal for said channel which is being provided by the LNB at the frequency that is being used by the LNB to provide a signal to said other satellite broadcast signal receiver.

In an example, the satellite broadcast signal receiver retunes to a frequency that is being used by the LNB to provide a signal to said other satellite broadcast signal receiver in response to the satellite broadcast signal receiver receiving from the LNB an instruction to retune to said frequency.

According to a fifth aspect disclosed herein, there is provided a satellite broadcast signal receiver for receiving signals from a LNB of a satellite dish which is operating according to single cable distribution in which a first frequency is allocated for a first satellite broadcast signal receiver to receive signals from the LNB and a second frequency different from the first frequency is allocated for a second satellite broadcast signal receiver to receive signals from the LNB, the satellite broadcast signal receiver being arranged to:

send a request to a said LNB for said LNB to transmit a signal for a channel to the satellite broadcast signal receiver;

wherein:

the satellite broadcast signal receiver is arranged to receive from a said LNB a signal for a channel requested by the satellite broadcast signal receiver at a frequency that is allocated to the satellite broadcast signal receiver in the case that the channel requested by the satellite broadcast signal receiver is different from a channel requested from a said LNB by another satellite broadcast signal receiver; and in the case that the channel requested by the satellite broadcast signal receiver is the same as a channel requested by another satellite broadcast signal receiver, the satellite broadcast signal receiver is arranged to retune to a frequency that is being used by the LNB to provide a signal to said other satellite broadcast signal receiver, such that the satellite broadcast signal receiver is able to receive the signal for said channel which is being provided by said LNB at the frequency that is being used by said LNB to provide a signal to said other satellite broadcast signal receiver.

In an example, the satellite broadcast signal receiver is arranged to retune to a frequency that is being used by a said LNB to provide a signal to a said other satellite broadcast signal receiver in response to the satellite broadcast signal receiver receiving from a said LNB an instruction to retune to said frequency.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

As mentioned, a satellite broadcast signal receiver is connected in use to a LNB of a satellite dish in order to receive signals broadcast by a satellite, typically for receiving television and/or radio channels. The receiver sends control signals to the LNB as required in order to reconfigure the LNB to select a desired channel that can be received by the satellite dish.

So-called "single cable distribution" (sometimes known by the name "unicable") enables the simultaneous delivery of channels from a single satellite dish to multiple receivers (typically for multiple users) over a single coaxial cable. In known single cable distribution, each receiver is allocated a "user band" having a different centre intermediate frequency for the signals that carry the channel signal (i.e. the broadcast programme) and that are passed from the satellite dish to the receiver. This enables multiple receivers to use the same satellite dish, which is useful when for example the multiple receivers are all located in the same building as a single satellite dish provided on the building can provide services for the multiple receivers. Moreover, a single cable can connect the satellite dish to all of the multiple receivers, which is convenient for users or installers of the system. (Again, for completeness, it is mentioned that in a typical installation there is a single cable from the LNB into the dwelling or other building in which the satellite broadcast signal receivers are located, even if ultimately there may be separate cables which split off from that single cable and which provide the final connection to the individual satellite broadcast signal receivers.)

Figure 1:
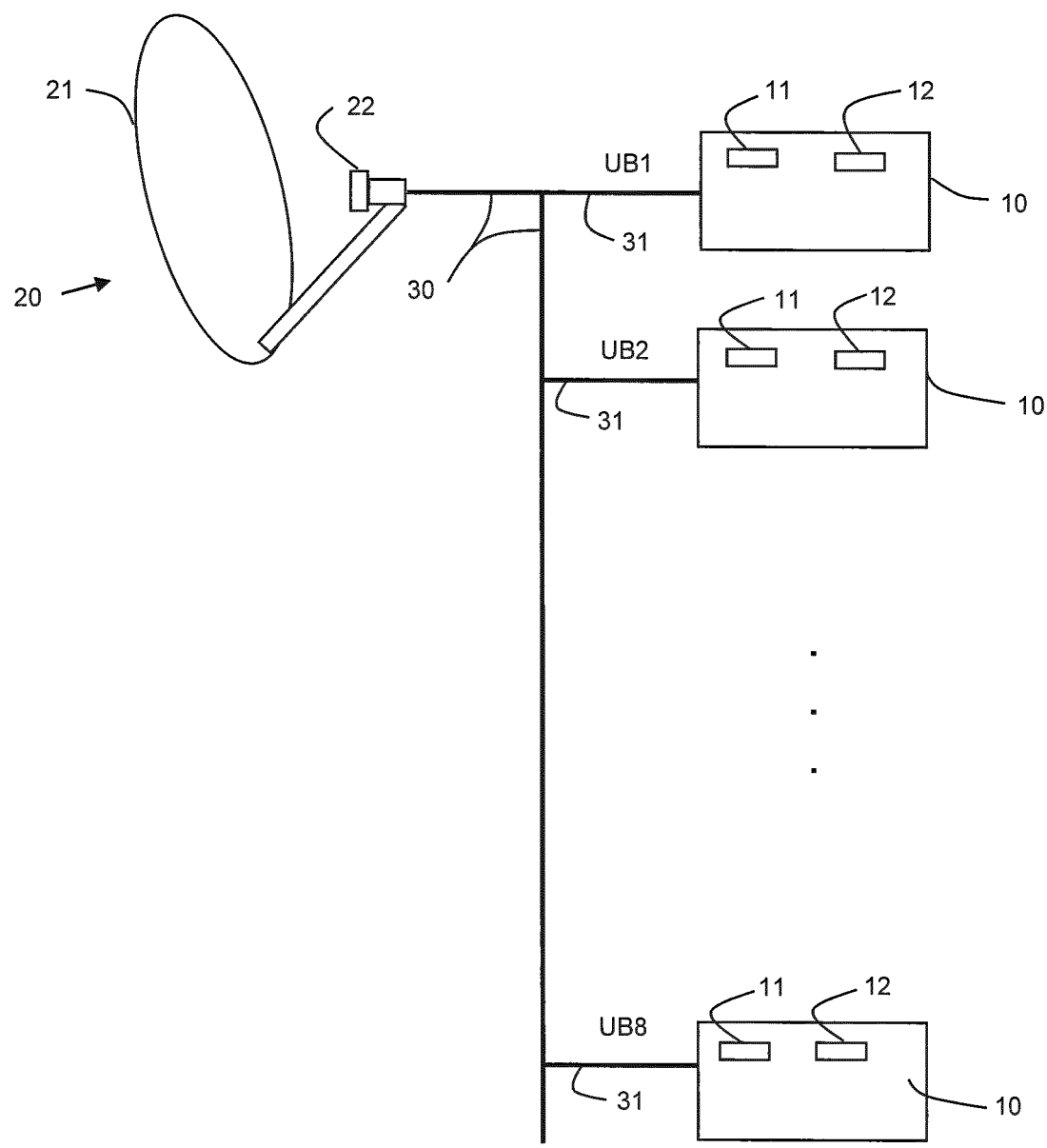
FIG. 1 shows schematically an example of plural satellite broadcast signal receivers connected to a satellite dish in a single cable distribution system according to an aspect of the present disclosure.

Referring now to FIG. 1, this shows schematically an example of plural satellite broadcast signal receivers 10 connected to a satellite dish 20. The satellite broadcast signal receivers 10 may be for example television sets, set-top boxes, PVR (personal video recorder, also known as a DVR or digital video recorder), an expansion card for a computer, etc., and may in general be the same type of device or different devices. The satellite broadcast signal receivers 10 have one or more processors 11, non-volatile data storage 12 for storing data, etc. The satellite dish 20 equipment is sometimes referred to as an outdoor unit (ODU), whether actually located outdoors or not. The satellite broadcast signal receivers 10 are sometimes referred to as integrated receiver/decoders (IRDs).

Each satellite broadcast signal receiver 10 is connected to the satellite dish 20 by a wired connection 30. The system shown is a single cable distribution system. Accordingly, there is a single wired connection 30 out of the satellite dish 20 to the different satellite broadcast signal receivers 10 (though there are also individual final wired connections 31 to the different satellite broadcast signal receivers 10). In the example shown, there are eight satellite broadcast signal receivers 10 (some being indicated by the ellipsis . . . ), which is a typical maximum for single cable distribution systems. The wired connection 30 is typically a coaxial cable, though a plastics optical fibre or other connection may be used.

As is well known per se, the satellite dish 20 has a parabolic reflector 21 which focusses signals received from a broadcasting satellite (not shown) to a so-called LNB (low-noise block downconverter) 22. The LNB 22 is located at the focal point of the parabolic reflector 21, or at least as close to the focal point as is practical. An LNB 22 is typically in effect a combination of a low-noise amplifier, a frequency mixer, a local oscillator and an intermediate frequency (IF) amplifier. In general, some of these components, including for example the mixer, may be provided as separate components or modules or may all be included in a single LNB block or module. The LNB may be implemented by or use one or more special semiconductor chips often referred to as "satellite channel routers".

The LNB 22 receives the (microwave) signal transmitted by the broadcasting satellite and collected by the parabolic reflector 21, amplifies it, and down converts the block of frequencies to a lower block of intermediate frequencies (IF). The down conversion at the LNB 22 permits the use of relatively inexpensive coaxial cable 30 to connect the LNB 22 to the satellite broadcast signal receivers 10. The cable 30 is connected to the LNB 22.

As is known, the broadcast signals transmitted by the satellite for receipt by satellite dishes 20 are typically in one or more specific frequency bands and may use a specific polarisation. For example, in Europe, the frequencies currently used by digital video broadcast satellite services DVB-S/DVB-S2 are 10.7-12.75 GHz on two polarisations H (Horizontal) and V (Vertical). (In the US, left and right circular polarisation is used rather than horizontal and vertical polarisation as used in Europe and at least most other countries.) This range is divided into a "low band" with 10.7-11.7 GHz and a "high band" with 11.7-12.75 GHz. This results in two frequency bands, each with a bandwidth of about 1 GHz, each with two possible polarisations. In the LNB 22, these bands are down converted to a frequency in the range 950-2150 MHz, which is the frequency range allocated for the satellite service on the coaxial cable between LNB 22 and the receivers 10. Numerous individual channels (i.e. television and/or radio channels) are transmitted within each band and having one polarisation or the other.

As mentioned and as illustrated schematically in FIG. 1, in known single cable distribution, each receiver 10 is allocated a "user band" UB1, UB2, . . . having a different centre intermediate frequency for the signals that carry the channel signal (i.e. the broadcast programme) and that are passed from the LNB 22 of the satellite dish 20 to the receiver 10. The different intermediate frequencies can be allocated to the receivers 10 in a number of ways. For example, in accordance with the CENELEC (European Committee for Electrotechnical Standardization) EN 50494 Standard entitled "SATELLITE SIGNAL DISTRIBUTION OVER A SINGLE COAXIAL CABLE IN SINGLE DWELLING INSTALLATIONS", a receiver 10 transmits a command to the LNB 20 for the LNB 20 to generate a number of signals at the available intermediate frequencies, and the receiver 10 adopts the first frequency that it encounters when scanning across the band of signals. Alternatively or additionally, the LNB 22 can instruct the receivers 10 as to which intermediate frequency to use. The LNB 22 has plural local oscillators, each for generating a different one of the plural intermediate frequencies which are used for providing signals to the individual receivers 10 over the cable 30.

In order to be able to receive and demodulate a particular channel as selected by a user, the receiver 10 associated with the user transmits a control signal to the LNB 22 to cause the LNB 22 to receive and process the correct corresponding signal that is broadcast by the satellite. For example, the control signal may cause the LNB 22 to receive and process the corresponding band (high or low) having the corresponding polarisation (horizontal or vertical) that is broadcast by the satellite. As a specific example to illustrate this, the United Kingdom television channel BBC One HD is (currently) broadcast with a frequency of 10,847 GHz and vertical polarisation. Accordingly, to enable the user to watch BBC One HD, a control signal is sent by the receiver 10 to the LNB 22 to instruct the LNB 22 to tune to the low frequency band with vertical polarisation.

A number of different arrangements and standards for such control signals are possible and are used. As a specific example to illustrate this, a voltage of 13V may be transmitted to select a vertical polarisation and a voltage of 18V may be transmitted to select a horizontal polarisation; and a "tone signal" of 22 kHz may be transmitted to select the high frequency band, the absence of a tone signal being taken by the LNB 22 as selection of the low frequency band.

In operation in known single cable distribution systems, the effect of this is as follows. Assume that a first user, user #1, with a first satellite broadcast signal receiver #1, wants to watch channel A. A first local oscillator of the LNB 22 therefore sets its frequency as UB1, which is the user band having the centre intermediate frequency allocated to the first satellite broadcast signal receiver #1, and provides the channel A on the cable 30 as UB1 frequency+Channel A frequency. Assume then that a second user, user 2, also wants to watch channel A. A second local oscillator of the LNB 22 therefore sets its frequency as UB2, which is the user band having the centre intermediate frequency allocated to the second satellite broadcast signal receiver #2, and provides the channel A on the cable 30 as UB2 frequency+ Channel A frequency. This means that two local oscillators of the LNB 22 are operating, even though only a single channel is being watched via the two satellite broadcast signal receivers 10 of user 1 and user 2. Likewise, if further users want to watch the same channel A, a corresponding number of further local oscillators of the LNB 22 are operating in order to provide the respective satellite broadcast signal receivers 10 of the further users with the requested channel A at the respective user band frequencies. Given that the same channel A is being transmitted, this effectively results in an unnecessarily high power consumption by the LNB 22.

To address this, in examples described herein, if the channel requested by the second satellite broadcast signal receiver #2 is different from the channel requested by the first satellite broadcast signal receiver #1, the LNB 22 (or, more specifically, the mixer of or associated with the LNB 22) in response provides a signal for the channel requested by the second satellite broadcast signal receiver #2 at the second frequency UB2 which is (normally) allocated to the second satellite broadcast signal receiver #2. This is in effect the normal operation in a single cable distribution system. On the other hand, if the channel requested by the second satellite broadcast signal receiver #2 is the same as the channel requested by the first satellite broadcast signal receiver #1, the LNB 22 in response to receiving that request provides an instruction to the second satellite broadcast signal receiver #2 for the second satellite broadcast signal receiver #2 to retune to the first frequency UB1 which is allocated to the first satellite broadcast signal receiver #1. In response to receiving that instruction, the second satellite broadcast signal receiver #2 retunes to that first frequency UB1. In that way, the second satellite broadcast signal receiver #2 receives the signal for the requested channel which is already being provided by the LNB 22 at the first frequency UB1. This means that the second local oscillator of the LNB 22, which normally generates a signal with the second frequency UB2 for the second satellite broadcast signal receiver #2, does not need to be operated or can be switched off. This immediately presents a power saving compared to a conventional single cable distribution system. Moreover, the power saving increases for each additional user who is watching the same channel on their own satellite broadcast signal receiver, as each of those satellite broadcast signal receivers can be instructed to retune to receive the requested channel which is already being provided by the LNB 22 at the first frequency UB1. Furthermore, in other arrangements, additional satellite broadcast signal receivers 10 may be connected to the LNB 22 and can make use of the local oscillator of the LNB 22 that is not being used at a particular time to provide signals for the other satellite broadcast signal receivers 10. This enables more efficient use of the single cable distribution system as it allows additional satellite broadcast signal receivers 10 to be connected. That is, for example the local oscillator of the LNB 22 that is not being used at a particular time to provide signals for the other satellite broadcast signal receivers 10 can be used to provide a different channel to another satellite broadcast signal receiver.

Figure 2:
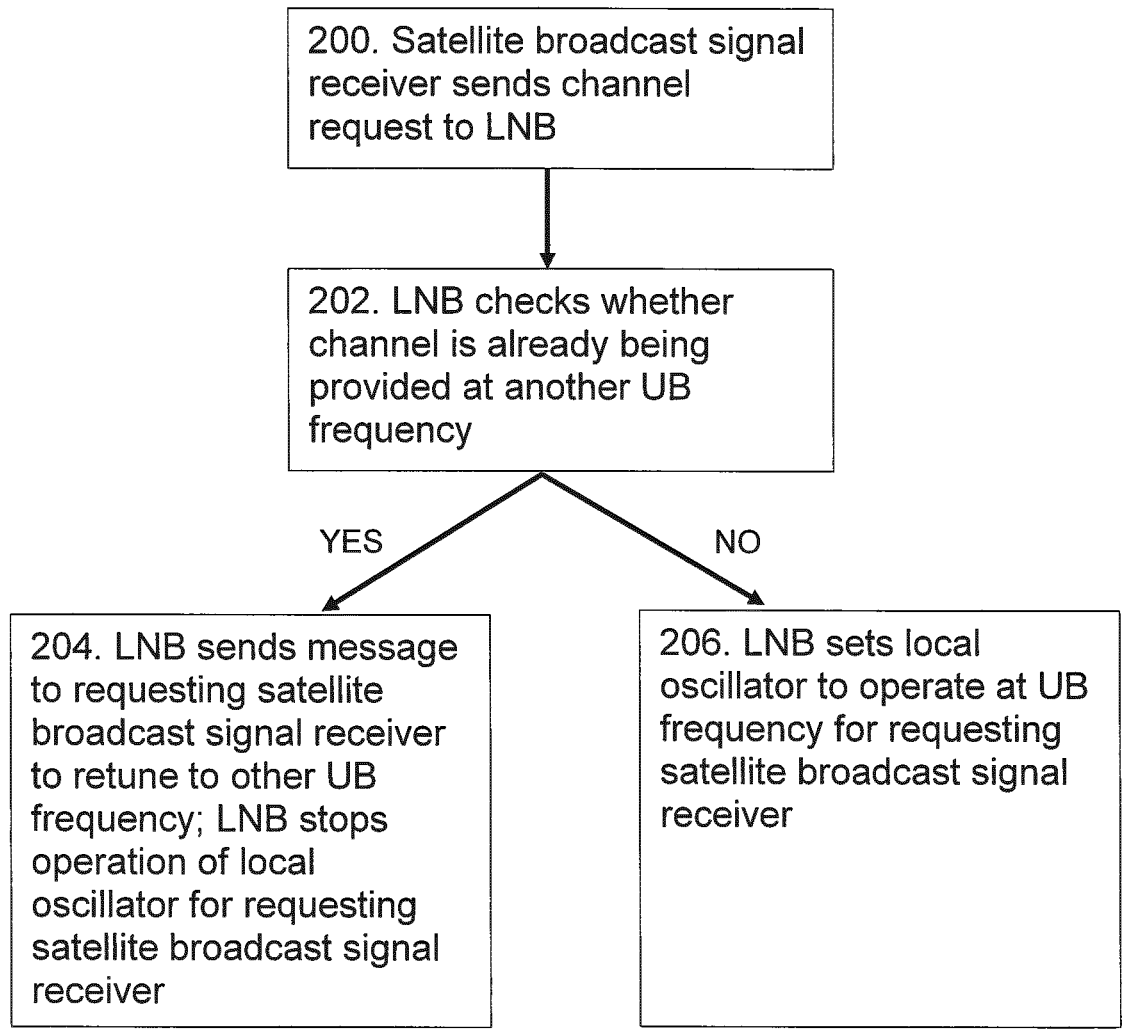
FIG. 2 shows schematically an example of a method according to an aspect of the present disclosure.

This is illustrated schematically in FIG. 2. At 200, a satellite broadcast signal receiver (in the above, satellite broadcast signal receiver #2) sends a channel request to the LNB 22. At 202, the LNB 22 checks whether the requested channel is already being provided at another UB frequency, for another satellite broadcast signal receiver (in the above, satellite broadcast signal receiver #1). If yes, then at 204 the LNB 22 sends a message to the requesting satellite broadcast signal receiver (here, satellite broadcast signal receiver #2) to retune to the other UB frequency, which is being used for sending the requested channel to the other satellite broadcast signal receiver (here, satellite broadcast signal receiver #1). In addition, the LNB 22 stops operation of the local oscillator for the requesting satellite broadcast signal receiver (here, satellite broadcast signal receiver #2) if that local oscillator is operating. On the other hand, if at the check at 202 it is determined that the requested channel is not being provided at another UB frequency, then at 206 the LNB 22 sets the local oscillator for the requesting satellite broadcast signal receiver (here, satellite broadcast signal receiver #2) to operate at the UB frequency for the requesting satellite broadcast signal receiver.

The various commands, requests and instructions, etc. between the LNB 22 and the satellite broadcast signal receivers 10 may be in accordance with the CENELEC EN 50494 Standard, which prescribes a Digital Satellite Equipment Communications (DiSEqC 1.x) protocol for the signalling between the LNB 22 and the satellite broadcast signal receivers 10.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of operating a low-noise block downconverter LNB of a satellite dish which is operating according to single cable distribution in which a first frequency is allocated for a first satellite broadcast signal receiver to receive signals from the LNB and a second frequency different from the first frequency is allocated for a second satellite broadcast signal receiver to receive signals from the LNB, the method comprising:
    the LNB receiving a request from the first satellite broadcast signal receiver to transmit a signal for a channel to the first satellite broadcast signal receiver, the LNB in response providing a signal for said channel at the first frequency which is allocated to the first satellite broadcast signal receiver;
    the LNB receiving a request from the second satellite broadcast signal receiver to transmit a signal for a channel to the second satellite broadcast signal receiver;
    wherein:
    if the channel requested by the second satellite broadcast signal receiver is different from the channel requested by the first satellite broadcast signal receiver, the LNB in response provides a signal for the channel requested by the second satellite broadcast signal receiver at the second frequency which is allocated to the second satellite broadcast signal receiver, and
    if the channel requested by the second satellite broadcast signal receiver is the same as the channel requested by the first satellite broadcast signal receiver, the LNB in response provides an instruction to the second satellite broadcast signal receiver for the second satellite broadcast signal receiver to retune to the first frequency such that the second satellite broadcast signal receiver receives the signal for said channel which is being provided by the LNB at the first frequency.

2. The method according to claim 1, wherein the LNB comprises at least a first local oscillator for generating an intermediate frequency signal at the first frequency and a second local oscillator for generating an intermediate frequency signal at the second frequency, wherein the signal for a channel that is sent by the LNB to a satellite broadcast signal receiver is formed by mixing a radio signal for the channel received at the satellite dish with the intermediate frequency signal for that satellite broadcast signal receiver, wherein if the channel requested by the second satellite broadcast signal receiver is the same as the channel requested by the first satellite broadcast signal receiver, the second local oscillator is not operated or is switched off or is used to provide a different channel to another satellite broadcast signal receiver.

3. A low-noise block downconverter LNB for a satellite dish which is operable according to single cable distribution in which a first frequency is allocated for a first satellite broadcast signal receiver to receive signals from the LNB and a second frequency different from the first frequency is allocated for a second satellite broadcast signal receiver to receive signals from the LNB, the LNB being arranged to:
    receive a request from a said first satellite broadcast signal receiver to transmit a signal for a channel to said first satellite broadcast signal receiver and, in response, provide a signal for said channel at the first frequency which is allocated to said first satellite broadcast signal receiver;
    receive a request from a said second satellite broadcast signal receiver to transmit a signal for a channel to said second satellite broadcast signal receiver;
    wherein the LNB is arranged such that:
    if the channel requested by a said second satellite broadcast signal receiver is different from the channel requested by a said first satellite broadcast signal receiver, the LNB in response provides a signal for the channel requested by said second satellite broadcast signal receiver at the second frequency which is allocated to said second satellite broadcast signal receiver, and if the channel requested by a said second satellite broadcast signal receiver is the same as the channel requested by a said first satellite broadcast signal receiver, the LNB in response provides an instruction to said second satellite broadcast signal receiver for said second satellite broadcast signal receiver to retune to the first frequency such that said second satellite broadcast signal receiver is able to receive the signal for said channel which is being provided by the LNB at the first frequency.

4. The LNB according to claim 3, wherein the LNB comprises at least a first local oscillator for generating an intermediate frequency signal at the first frequency and a second local oscillator for generating an intermediate frequency signal at the second frequency, the LNB being arranged such that the signal for a channel that is sent by the LNB to a satellite broadcast signal receiver is formed by mixing a radio signal for the channel received at the satellite dish with the intermediate frequency signal for that satellite broadcast signal receiver, wherein if the channel requested by a said second satellite broadcast signal receiver is the same as the channel requested by a said first satellite broadcast signal receiver, the second local oscillator is not operated or is switched off or is used to provide a different channel to another satellite broadcast signal receiver.

5. A non-transitory computer readable storage medium storing a computer program with instructions executable by a processor, the instructions being such that when executed on a low-noise block downconverter (LNB) of a satellite dish which is operating according to single cable distribution, the LNB is arranged to carry out a method comprising:

the LNB receiving a request from the first satellite broadcast signal receiver to transmit a signal for a channel to the first satellite broadcast signal receiver, the LNB in response providing a signal for said channel at the first frequency which is allocated to the first satellite broadcast signal receiver;

the LNB receiving a request from the second satellite broadcast signal receiver to transmit a signal for a channel to the second satellite broadcast signal receiver;

wherein:

if the channel requested by the second satellite broadcast signal receiver is different from the channel requested by the first satellite broadcast signal receiver, the LNB in response provides a signal for the channel requested by the second satellite broadcast signal receiver at the second frequency which is allocated to the second satellite broadcast signal receiver, and if the channel requested by the second satellite broadcast signal receiver is the same as the channel requested by the first satellite broadcast signal receiver, the LNB in response provides an instruction to the second satellite broadcast signal receiver for the second satellite broadcast signal receiver to retune to the first frequency such that the second satellite broadcast signal receiver receives the signal for said channel which is being provided by the LNB at the first frequency.

6. The non-transitory computer readable storage medium according to claim 5, the computer program comprising instructions such that, where the LNB comprises at least a first local oscillator for generating an intermediate frequency signal at the first frequency and a second local oscillator for generating an intermediate frequency signal at the second frequency, and the signal for a channel that is sent by the LNB to a satellite broadcast signal receiver is formed by mixing a radio signal for the channel received at the satellite dish with the intermediate frequency signal for that satellite broadcast signal receiver:

if the channel requested by the second satellite broadcast signal receiver is the same as the channel requested by the first satellite broadcast signal receiver, the second local oscillator is not operated or is switched off or is used to provide a different channel to another satellite broadcast signal receiver.

7. A method of operating a satellite broadcast signal receiver for receiving signals from a LNB of a satellite dish which is operating according to single cable distribution in which a first frequency is allocated for a first satellite broadcast signal receiver to receive signals from the LNB and a second frequency different from the first frequency is allocated for a second satellite broadcast signal receiver to receive signals from the LNB, the method comprising:

the satellite broadcast signal receiver sending a request to the LNB for the LNB to transmit a signal for a channel to the satellite broadcast signal receiver;

wherein:

if the channel requested by the satellite broadcast signal receiver is different from a channel requested from the LNB by another satellite broadcast signal receiver, the satellite broadcast signal receiver receives from the LNB in response a signal for the channel requested by the satellite broadcast signal receiver at a frequency that is allocated to the satellite broadcast signal receiver, and if the channel requested by the satellite broadcast signal receiver is the same as a channel requested by another satellite broadcast signal receiver, the satellite broadcast signal receiver retunes to a frequency that is being used by the LNB to provide a signal to said other satellite broadcast signal receiver, such that the satellite broadcast signal receiver receives the signal for said channel which is being provided by the LNB at the frequency that is being used by the LNB to provide a signal to said other satellite broadcast signal receiver.

8. The method according to claim 7, wherein the satellite broadcast signal receiver retunes to a frequency that is being used by the LNB to provide a signal to said other satellite broadcast signal receiver in response to the satellite broadcast signal receiver receiving from the LNB an instruction to retune to said frequency.

9. A satellite broadcast signal receiver for receiving signals from a LNB of a satellite dish which is operating according to single cable distribution in which a first frequency is allocated for a first satellite broadcast signal receiver to receive signals from the LNB and a second frequency different from the first frequency is allocated for a second satellite broadcast signal receiver to receive signals from the LNB, the satellite broadcast signal receiver being arranged to:

send a request to a said LNB for said LNB to transmit a signal for a channel to the satellite broadcast signal receiver;

wherein:

the satellite broadcast signal receiver is arranged to receive from a said LNB a signal for a channel requested by the satellite broadcast signal receiver at a frequency that is allocated to the satellite broadcast signal receiver in the case that the channel requested by the satellite broadcast signal receiver is different from a channel requested from a said LNB by another satellite broadcast signal receiver; and in the case that the channel requested by the satellite broadcast signal receiver is the same as a channel requested by another satellite broadcast signal receiver, the satellite broadcast signal receiver is arranged to retune to a frequency that is being used by the LNB to provide a signal to said other satellite broadcast signal receiver, such that the satellite broadcast signal receiver is able to receive the signal for said channel which is being provided by said LNB at the frequency that is being used by said LNB to provide a signal to said other satellite broadcast signal receiver.

10. The satellite broadcast signal receiver according to claim 9, wherein the satellite broadcast signal receiver is arranged to retune to a frequency that is being used by a said LNB to provide a signal to a said other satellite broadcast signal receiver in response to the satellite broadcast signal receiver receiving from a said LNB an instruction to retune to said frequency.

* * * * *